United States Patent [19]

Sakashita et al.

[11] Patent Number: 4,785,058
[45] Date of Patent: Nov. 15, 1988

[54] COMPOSITIONS FOR TIRES

[75] Inventors: Tatsuo Sakashita, Suita; Takyya Okazaki, Toyonaka; Masanori Kan, Amagasaki, all of Japan

[73] Assignee: The Toyo Rubber Industry Co., Ltd., Osaka, Japan

[21] Appl. No.: 846,270

[22] Filed: Mar. 26, 1986

Related U.S. Application Data

[63] Continuation-in-part of Ser. No. 611,694, May 18, 1984, abandoned, which is a continuation-in-part of Ser. No. 358,871, Mar. 16, 1982, abandoned.

[30] Foreign Application Priority Data

May 15, 1981 [JP] Japan ................................ 56-73954

[51] Int. Cl.$^4$ ............................................. C08F 236/00
[52] U.S. Cl. ........................................ 526/314; 526/340
[58] Field of Search ................................ 526/314, 340

[56] References Cited

U.S. PATENT DOCUMENTS

| | | | |
|---|---|---|---|
| 3,980,624 | 9/1976 | Minekawa | 525/314 |
| 3,985,830 | 10/1976 | Fetters | 525/314 |
| 4,163,765 | 8/1979 | Moczygemba | 525/314 |
| 4,334,567 | 6/1982 | Bond | 525/340 |

Primary Examiner—Paul R. Michl
Assistant Examiner—Lee C. Wright
Attorney, Agent, or Firm—Koda and Androlia

[57] ABSTRACT

A composition for tires containing at least 30% star shaped random styrene-butadiene copolymer obtained by solution polymerization, having a styrene content of less than 20% and more than 10% and a vinyl content of less than 50% and more than 40%, the composition value X of said copolymers being in a range of 26 to 39 obtained by using the equation;

$$X = \text{styrene content (\%)} + \frac{\frac{100 - \text{styrene constant (\%)}}{100} \times \text{vinyl content (\%) in } BR}{2}$$

wherein BR is the butadiene component, the glass transition temperature being a single one below $-50°$ C. and lower than estimated glass transition temperature following Gordon-Taylor equation by 5° to 10° C. and a cured composition showing loss modulus of lower than $1 \times 10^{-7}$ dyn/cm$^2$ and a ratio of rolling resistance to wet grip being smaller than 0.82.

3 Claims, 3 Drawing Sheets

COMPOSITIONS FOR TIRES

RELATED APPLICATIONS

This is a continuation-in-part of application Ser. No. 611,644, filed May 18, 1984, now abandoned. which is a continuation-in-part of Ser. No. 358,871 filed on Mar. 16, 1982 now abandoned.

BACKGROUND OF THE INVENTION

1. Field of the Invention

The present invention relates to a composition for tires which provides a vehicle tire tread with low rolling resistance as well as high wet grip performance and more particularly to a tire tread provided with a balance among five major characteristic properties, tire rolling resistance, wet grip performance, wear resistance, steering stability and crack resistance.

2. Prior Art

In conventional tire treades styrene butadiene copolymers of the straight chain type obtained by emulsion polymerization were used in most cases, and those obtained by solution polymerization were also used. Also, in terms of the relationship between styrene content and vinyl content, the conventional styrene butadiene polymers were less in vinyl content (the vinyl conent here means, 1, 2-bonded butadiene content in the butadiene component) and furthermore were insufficient in the balancing among the above mentioned five major characteristics.

SUMMARY OF THE INVENTION

Accordingly, it is a general object of the present invention to provide a composition for tires capable of satisfying all of the five major requirements.

The objects of the present invention are achieved by the use of styrene-butadiene copolymer (SBR) obtained by solution polymerization and by limiting the styrene content (%) as well as the vinyl content (%) in the butadiene component contained in the SBR to a specified range, and in addition by the preferred use of star shaped polymers since those with high coupling efficiency (many of which have the star shaped molecular structure) are low in rolling resistance while being high in wear resistance.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

The composition value X of SBR, which indicates the limited range of the present invention, is obtained by the equation shown below:

$$X = \text{Content of styrene (\%)} + \frac{\frac{100 - \text{styrene content}}{100} \times \text{vinyl content (\%) in } BR}{2} \quad \text{Equation [1]}$$

In the above equation, BR is the butadiene component; the vinyl content (%) in BR is 1, 2-bonded butadiene content (%) in the butadiene component BR.

The composition value X obtained by the equation shown above is limited to the range of 26 to 39. Consequently, for the boundary between the lower limit line and the upper limit line with regard to the styrene content (%) and the vinyl content (%) in the SBR, when the styrene content (%) is represented by the ordinate while the vinyl content (%) in the BR is represented by the abscissa, the lower limit line of the value X is equal to 26. In this case, in Equation [1] when the vinyl content (%) in the butadiene component is 0 the styrene content is 26; while when the styrene content is 0 the vinyl content in the butadiene component is 52. Therefore, the straight line connecting the point at 26 on the ordinate and that at 52 on the abscissa is the lower limit line and is called the lower limit 26 (LL-26). The upper limit line is that value where X equals 39 and the straight line connecting the points at 39 on the ordinate and the point at 78 on the abscissa forms the upper limit line that is called the upper limit 39 (UL-39).

In other words the styrene-butadiene copolymers obtained by solution polymerization are those limited in relationship between their styrene content and vinyl content to those that bind in the area between the lower limit line 26 and the upper limit line 39 obtained from the Equation [1]. This means that the styrene-butadiene copolymers prepared by solution polymerization are formed in a range limited in terms of the correlationship between the styrene content (%) and the vinyl content (%) in the SBR that is set within the range of 26 to 39 in the composition value X. The vinyl content (%) here means the content (%) of 1, 2 bonded butadiene in the butadiene component.

Figure 1:
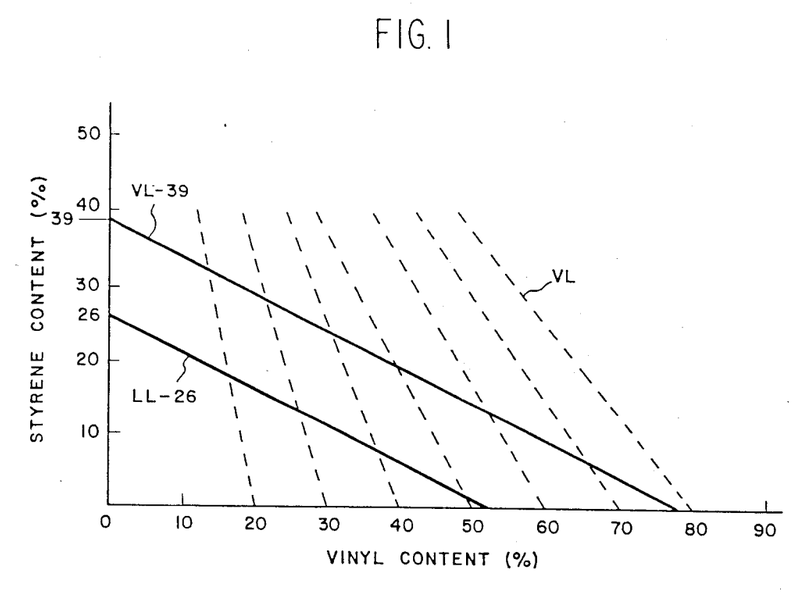
FIG. 1 is a graph showing a lower limit (LL-26), an upper limit (UL-39) of the composition as well as the variable lines (VL) of vinyl content by plotting the styrene content (%) on the ordinate while representing the vinyl content (%) by the abscissa.

In summary, the styrene-butadiene copolymers prepared by the solution polymerization, which are used in the present invention, are the styrene-butadiene copolymers which exist only in the range between both the straight lines, i.e., the lower limit line 26 and the upper limit line 39 in FIG. 1.

Also, the vinyl content of SBR varies depending on the styrene content (%). This variation occurs as shown by the variable lines indicated by the dotted lines of FIG. 1 and these lines are defined as the variable lines (VL) of the vinyl content. For example, when the vinyl content (%) is 80 and if the styrene content (%) is 40, the vinyl content becomes 48, and the line connecting 80 and 48 by the dotted line forms the variable line for 80% vinyl content. Hence, just at the relationship between the styrene content (%) and the vinyl content (%) is limited to the range defined by the boundary between the lower limit line (LL-26) and the upper limit (UL-39) of the styrene content, is also limited by the variable line (VL) of the vinyl content (%).

In the following paragraphs a description will be given with regard to the technical background for the development of the compostion value X described above.

Recently, it has become a worldwide necessity to save energy resources and as a result it has been necessary with regard to tires to take measures to cut the use of energy, that is, to contribute to the reduction in fuel consumption by motor vehicles, the development of such measures is called for urgently.

Basically, the primary factor contributing to the rolling resistance of the tire is the internal friction of the material composing the tire. In the internal friction the portion such as tread, sidewall, carcass and inner liner are assumed to be contrubting. Among these elements of the tire, the contribution of the tread is greatest. Consequently, it is most effective for obtaining lower rolling resistance to reduce the energy loss derives from compression, bending, shearing, etc. of the composite rubber for the tread.

It has been a widely known fact that generally the tread composition showing a satisfactory wet grip performance in road running for a rubber tire is inferior in the rolling resistance. Thus, both of these performances are in conflict with each other.

In general the wet grip performance and low rolling resistance of general-purpose polymers are considered to have the following relationship. That is, when a ranking order from desirable to undesirable qualities for general purpose polymers is given to natural rubber (NR), butadiene rubber (BR) and styrene-butadiene rubber (SBR), the properties shown below are found.

In low rolling resistance:

superior (desirable)→inferior (undesirable)

NR≧BR>SBR by solution polymerization>SBR by emulsion polymerization

In wet grip performance:

superior→inferior

Emulsion polymerization SBR>Solution polymerization SBR>NR>BR

How to reconcile the requirements for these two mutually opposing performances into a compatible relationship is a serious challenge imposed on those engaged in the development of rubber tires. However, for the performance of tires, in addition to the performances mentioned above, the wear resistance, crack resistance and steering stability must also be satisfied respectively and a balance in these five characteristic properties or performances are required for the tire.

The present invention intends to provide a composition for tires well balanced and capable of meeting all of the requirements for the above described five characteristics.

As to the wet grip performance the amount of styrene and that of vinyl contained in SBR is assumed to the following relationship:

That is, one styrene unit plays the equivalent role as two vinyl unit do. Such a relationship indicates that with an increase in the composition value X, the wet grip performance is upgraded. However, it has been found that such a relationship does not hold for the other characteristic properties and possibility of obtaining a tire composition having a balance with the other characteristic properties has been sought after and discovered.

In this connection, according to the data presented in RUBBER INDUSTRY 40(6)T239 (1964) the loss modulus $E''$ of the specific viscoelasticity is closely related to the rolling resistance, and with a decrease in $E''$, the low fuel cost performance improves. Accordingly, in pursuit of the present invention, as a primary test the $E''$ of the viscoelasticity was measured using a dynamic elastic visco spectrometer; and the star shaped SBR by solution polymerization used in the present invention was compared with the SBR by emulsion polymerization that is the general-purpose SBR in conventional use. As the conditions for this test, in order to obtain conditions closer to those achieved during the running of the tire a tread temperature of 60° C. during running and a vibration frequency for the rubber of 100 Hz were selected. The results are shown in FIG. 2.

The abscissa represents the composition value X of the present invention while the ordinate represents the loss modulus $E''$, and the numerical value is shown by $E'' \times 10^{-7}$ dyne/cm$^2$.

The symbol  denotes the conventional SBR by emulsion polymerization and the symbol  represents the star shaped polymers of SBR by solution polymerization. Samples 2, 3, 4 and 5 are samples with compositions described later in Table 1. Samples 6, 7, 8, 10 and 11 are samples with compositions listed in Table 2, shown later.

Figure 2:
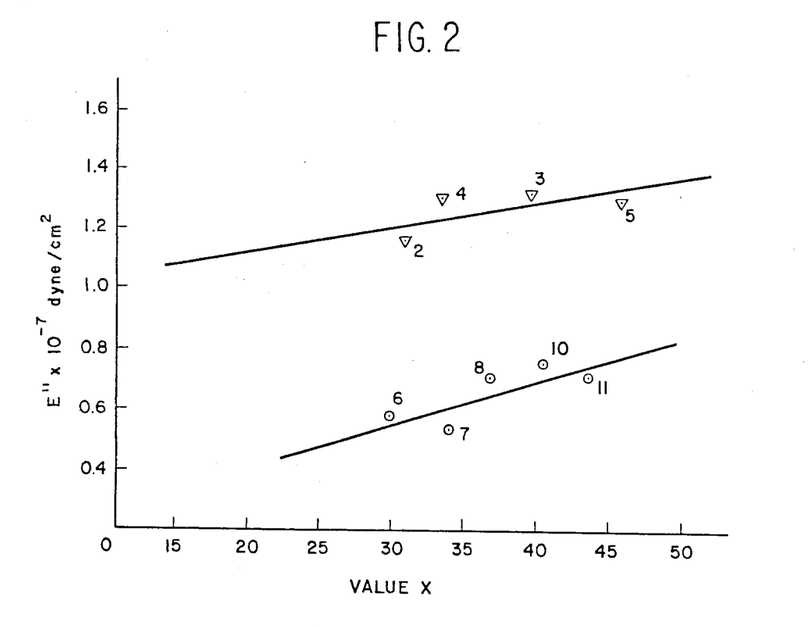
FIG. 2 is a graph showing the relationship between the value X and lost modulus $E''$.

As is seen in FIG. 2, the emulsion polymerization SBR that is the conventially used polymer and the solution polymerization SBR used in the present invention show different levels, respectively, i.e., as the value of $E''$, the general purpose emulsion polymerization SBR in conventional use shows a value about twice that shown by the solution polymerization SBR. Thus, from the data above it could be inferred that the solution polymerization SBR is effective for a considerably low rolling resistance.

In addition to the above, the solution polymerization SBR used in the present invention can be made by a process such as described in U.S. Pat. No. 2,975,160 except that polymerization is carried out in non-polar hydrocarbon solvent such as n-hexaneorheptene with randomizer such as tetra hydrofuran or dioxane and added a small amount of butadiene and coupling agent after almost of monomer convert to copolymer. The method of this patent excludes block polymers and copolymers and solution polymerization SBR with block polymers and/or copolymers are not used in the present invention because block polymers have high hysteresis loss and poor wear resistance.

There are two kinds of block copolymers. One of them has two glass transition temperature for block styrene and residue of styrene block in molecular chain and is hard at room temperature without vulcanization. Other of them has short styrene blocks caused by consequence of styrene being non-random and has one glass transition temperature which deviates to glass transition temperature of poly butadiene homopolymer. Difference of glass transition temperature between observation and estimate by Gordon-Taylor equation described in RUBBER CHEMISTRY AND TECHNOLOGY Vol 42, pages 520–529 (1969) is larger than random copolymer and shift to lower temperature zone.

Therefore, block SBR copolymers are less preferrable for use in low-fuel-consumption tires than random SBR copolymers. In addition, the solution polymerization SBR of the present invention includes a random copolymer which is quite different from block copolymers as is discussed in the JOURNAL OF APPLIED POLYMER SCIENCE, Volume 11, pages 1581 to 1591 (1967).

The abscissa of FIG. 2 indicates the value X and this value X is considered to be a parameter of the wet grip performance. Therefore, the wet grip performance is expected to be better in parallel with an increase in the value X. On this assumption, it was found that by the use of the solution polymerization SBR, the conversion into an excellent composition with a good balance obtained between both characteristic properties, the wet grip performance and the fuel efficiency performance becomes possible. In other words, in the past, generally, the assumption went by as follows: a decrease in vinyl content in the SBR brings about the enhancement in wear resistance, and also contributes to a lower rolling resistance, on the contrary, however, the increase in vinyl content effects the improvement in the wet grip performance, thus, the rolling resistance and the wet grip performance are in opposition to each other, thus it is difficult to obtain high performance for both at the same time.

However, from the test results shown in FIG. 2, it is revealed that the conventionally used SBR polymers by emulsion polymerization and the polymers of SBR by solution polymerization are very different in their level of rolling resistance which correlates with lose modulus E''; hence, a considerable improvement in wet grip performance seem to be achieveable. Specifically, a noticeable difference is observed for the star shaped polymers of SBR by solution polymerization.

Applying these obtained findings as the basics, a condition for obtaining a composition for tires with a balance between the other necessary characteristics was searched for. In the main trend of conventional use, only polymers of emulsion polymerization SBR were used for ordinary treads; but for all-weather tire types, polymers obtained by blending emulsion polymerization SBR with BR have been used. Therefore, those polymers mentioned above as samples No. 1 and No. 2 in Table 1, shown later, were used as the standard. Then, those having physical properties exceeding the standard were regarded as in excellent performance and sought for as the composite for tires of the present invention. To this effect, as the next step, respective specific properties such as glass transistion point ($T_g$), the loss modulus E'', the wear resistance, the wet grip performance and the steering stability were measured for various types of emulsion polymerization SBR and solution polymerization SBR and their composition values X were compared with those of the solution polymerization SBR of the present invention.

With regard to wear resistanct, as is stated in the article in R.C.T., 34, 1(1961), the Pico wear test and the actual tire running wear test correlate to a high degree. Therefore, by assuming that a better Pico wear means better actual wear, a Pico wear test was carried out. Also for the wet grip performance, the article in R.C.T., 38, 840(1965) describe a portable wet skid tester manufactured by Stanely Co. of England in which the higher the value shown in the test, the better the wet grip performance obtained in actual running for the tire having the tread using the rubber with the higher test value. This portable wet skid tester was utilized and a comparison was made according to the test value described above.

Table 1 shows the results of the test conducted for the conventional composition having emulsion polymerization SBR as the primary component.

Table 2 shows the comparison for the star shaped polymers of solution polymerization SBR between those with a composition value X within the lower limit (LL-26) and the upper limit (UL-39) of the present invention and those with a composition value X distributed outside the lower and upper limits.

Table 3 shows a comparison with the composition value X of the normal chain polymers of solution polymerization SBR.

Table 4 shows a comparison for samples between those having more than 30 percent of star shaped polymers of solution polymerization SBR and those having less than 30 percent content of said star shaped polymers.

TABLE 1

| | | | | | Parts by Weight |
|---|---|---|---|---|---|
| Sample No. | 1 | 2 | 3 | 4 | 5 |
| Component | | | | | |
| SBR 1502 | 70 | 100 | 41 | 21 | |
| UBE 150B | 30 | | | 20 | |
| Emulsion Polymerization SBR | | | 59 | 59 | 100 |
| Carbon N-339 | 45 | 45 | 45 | 45 | 45 |
| Higher Aromatic Oil | 5 | 5 | 5 | 5 | 5 |
| ZnO | 3 | 3 | 3 | 3 | 3 |
| Stearic Acid | 2 | 2 | 2 | 2 | 2 |
| Aging Resistor (Antiozonant) (Santoflex 13) | 1.5 | 1.5 | 1.5 | 1.5 | 1.5 |
| Accelerator CZ | 1.5 | 1.5 | 1.5 | 1.5 | 1.5 |
| Accelerator D | 0.2 | 0.2 | 0.2 | 0.2 | 0.2 |
| S | 2 | 2 | 2 | 2 | 2 |
| Characteristic Property | | | | | |
| Glass Transition Point (Tg) °C. | | | | | |
| measured | | −59 | −50 | −53 | −40 |
| estimated | | −60 | −57 | −50 | −50 |
| Loss modulus (E'') E'' × 10$^{-7}$ dyne/cm$^2$ | | 1.16 | 1.32 | 1.31 | 1.30 |
| Wear Resistance | | 100 | 91 | 100 | 83 |
| Wet Grip Performance | 44(94) | 47(100) | 50(107) | 47(100) | 52(111) |
| Rolling Resistance | 94 | 100 | 104 | | 111 |
| Crack Resistance | 300 | 100 | 70 | 80 | 60 |
| Steering Stability | 90 | 100 | 113 | 107 | 119 |
| Composition Value X | 22 | 31 | 39.7 | 33.5 | 41.8 |
| Vinyl Content (%)/ Styrene Content (%) | | 19/23.5 | 20.2/30 | 20.5/32.0 | 21/35 |
| cis 1,4 content (%) | | 13 | 14.2 | 14.5 | 15 |
| trans 1,4 content (%) | | 68 | 65.6 | 65 | 64 |
| ratio of rolling resistance to wet grip | 1.00 | 1.00 | 0.97 | 1.02 | 1.00 |

Note
SBR 1502 - classified by International Institute of Synthetic Rubber producers, Ing. and having linear chain structure formed by low temperature emulsion polymerization.
UBE 150B - Butadiene rubber manufactured by Ube Industries Ltd.
Carbon N-339 - Carbon black manufactured by Mitsubishi Chemical Industries, Ltd. N-339 is a type nane provided by ASTM-D-1765, and is the carbon of HAF-HS-HT.
Age resistor (antiozonant) (Santoflex 13) - N—phenyl-N'—(1,3-dimethylbutyl)-P—phenylenediamine from Mitsubishi-Monsanto Co.
Accelerator D - Diphenylguanidine
Accelerator CZ - N—cyclohexyl-2-benzothiazole-sulfornamide.

TABLE 2

| Sample No. | 6 | 7 | 8 | 9 | 10 | Parts by weight 11 |
|---|---|---|---|---|---|---|
| Component | | | | | | |
| Solution Polymerization SBR Star Form | (a) 100 | (b) 100 | (c) 100 | (d) 100 | (e) 100 | (f) 100 |
| Carbon N-339 | 45 | 45 | 45 | 45 | 45 | 45 |
| Higher Aromatic Oil | 5 | 5 | 5 | 5 | 5 | 5 |
| ZnO | 3 | 3 | 3 | 3 | 3 | 3 |
| Stearic Acid | 2 | 2 | 2 | 2 | 2 | 2 |
| Aging Resistor (Santoflex 13) | 1.5 | 1.5 | 1.5 | 1.5 | 1.5 | 1.5 |
| Accelerator CZ | 1.5 | 1.5 | 1.5 | 1.5 | 1.5 | 1.5 |
| Accelerator D | 0.2 | 0.2 | 0.2 | 0.2 | 0.2 | 0.2 |
| S | 2 | 2 | 2 | 2 | 2 | 2 |
| Characteristic Property | | | | | | |
| Glass Transition Point (Tg) °C. | | | | | | |
| measured | −64 | −59 | −53 | −56 | −51 | −41 |
| estimated | −54 | −50 | −47 | −49 | −36 | −30 |
| Loss modulus (E″) E″ × $10^{-7}$ dyne/cm$^2$ | 0.57 | 0.54 | 0.71 | | 0.76 | 0.72 |
| Wear Resistance | 109 | 107 | 103 | 96 | 95 | 82 |
| Wet Grip Performance | 48.5 (103) | 49.5 (105) | 49.8 (106) | 51.5 (107) | 53 (113) | 52.6 (112) |
| Rolling Resistance | 82 | 84 | 88 | 91 | 87 | 88 |
| Crack Resistance | 600 | 800 | 700 | 200 | 400 | 300 |
| Steering Stability | 108 | 111 | 110 | 104 | 115 | 116 |
| Composition Value X | 30 | 34 | 37 | 38.5 | 40.5 | 43.5 |
| Vinyl Content (%)/ Styrene Content (%) | 45/10 | 45/15 | 45/19 | 36/25 | 60/15 | 67/15 |
| cis 1,4 content (%) | 26 | 25 | 24 | 25 | 17 | 15 |
| trans 1,4 content (%) | 29 | 30 | 31 | 39 | 23 | 18 |
| ratio of rolling resistance to wet grip | 0.78 | 0.78 | 0.81 | 0.85 | 0.77 | 0.79 |

Note
Symbols (a), (b), (c), (d), (e) and (f) indicate the difference in vinyl content (%)/styrene content (%) of the star shaped polymers of solution polymerization SBR.

TABLE 3

| Sample No. | 12 | 13 | Parts by weight 14 |
|---|---|---|---|
| Component | | | |
| Solution Polymerization SBR Normal Chain Form | (g) | (h) | (i) |
| Carbon N-339 | 45 | 45 | 45 |
| Higher Aromatic Oil | 5 | 5 | 5 |
| ZnO | 3 | 3 | 3 |
| Stearic Acid | 2 | 2 | 2 |
| (Santoflex 13) | 1.5 | 1.5 | 1.5 |
| Accelerator CZ | 1.5 | 1.5 | 1.5 |
| Accelerator D | 0.2 | 0.2 | 0.2 |
| S | 2 | 2 | 2 |
| Specific Property | | | |
| Glass Transition Point (Tg) °C. | | | |
| measured | −56 | −53 | −47 |
| estimated | −45 | −42 | −39 |
| Loss modulus (E″) E″ × $10^{-7}$ dyne/cm$^2$ | 0.98 | 0.95 | 1.15 |
| Wear Resistance | 88 | 84 | 85 |
| Wet Grip Performance | 51(109) | 52(111) | 53(113) |
| Rolling Resistance | 91 | 93 | 95 |
| Crack Resistance | 500 | 300 | 200 |
| Steering Stability | 104 | 103 | 105 |
| Composition Value X | 36 | 37 | 42 |
| Vinyl Content (%)/ Styrene Content (%) | 50/15 | 49.5/16.5 | 47/24 |
| cis 1,4 content (%) | 21 | 16 | 19 |
| trans 1,4 content (%) | 29 | 34.5 | 34 |
| ratio rolling resistance to wet grip | 0.83 | 0.83 | 0.84 |

Note
Symbols (g), (h) and (i) indicate the difference in vinyl content (%)/styrene content (%) of straight chain polymers of solution polymerization SBR.

TABLE 4

| Sample No. | 15 | 16 | 17 | 7 | Parts by weight 18 |
|---|---|---|---|---|---|
| Component | | | | | |
| SBR 1502 | | | | | 30 |
| NR | 80 | 65 | 30 | | |
| Solution Polymerization SBR Star | (b) 20 | (b) 35 | (b) 70 | (b) 100 | 70 |
| Carbon N-339 | 45 | 45 | 45 | 45 | 45 |
| Higher Aromatic Oil | 5 | 5 | 5 | 5 | 5 |
| ZnO | 3 | 3 | 3 | 3 | 3 |
| Stearic Acid | 2 | 2 | 2 | 2 | 2 |
| Aging Resistor (Santoflex 13) | 1.5 | 1.5 | 1.5 | 1.5 | 1.5 |
| Accelerator CZ | 1.5 | 1.5 | 1.5 | 1.5 | 1.5 |
| Accelerator D | 0.2 | 0.2 | 0.2 | 0.2 | 0.2 |
| S | 2 | 2 | 2 | 2 | 2 |
| Specific Property | | | | | |
| Glass Transition Point (Tg) °C. | | | | | −59 |
| Loss modulus (E″) E″ × $10^{-7}$ dyne/cm$^2$ | 0.99 | 0.81 | 0.63 | 0.54 | 1.03 |
| Wear Resistance | 97 | 102 | 105 | 107 | 109 |
| Wet Grip Performance | 96 | 102 | 104 | 105 | 108 |
| Rolling Resistance | 82 | 83 | 84 | 84 | 85 |
| Crack Resistance | 1800 | 1330 | 900 | 800 | 500 |
| Steering Stability | 95 | 104 | 109 | 111 | 115 |
| Composition Value X | | | | | 34 |
| Vinyl Content (%)/ Styrene Content (%) | | | | | 45/15 |
| ratio rolling resistance to wet grip | 0.85 | 0.80 | 0.80 | 0.80 | 0.79 |

The respective characteristics shown in the foregoing tables were measured by the methods described below.

1. Glass Transition Point ($T_g$)

The glass transition point ($T_g$) was measured at 20° C. per minute as the heating up rate using a model DSC-2 manufactured by Perkin-Elmer Co. according to ASTM D 3418-82.

Estimated glass transition point is obtained by the following equation which bases upon Gordon-Taylor equation:

$$T_g = \frac{150W_s - 30W_v - 559W_c - 296W_t}{1.5W_s + 4.3W_v + 4.9W_c + 2.9W_t}$$

Ws: weight fraction of styrene
Wv: weight fraction of vinyl configuration
Wc: weight fraction of cis 1,4 configuration'
Wt: weight fraction of trans 1,4 configuration

2. Loss modulus (E″)

The Loss modulus (E″) was measured by using the dynamic viscoelasticity spectrometer manufactured by Iwamoto Seisakusho at 60° C. and 100 Hz. The comparison was made by using $E'' \times 10^{-7}$ dyne/cm$^2$ for contrast value.

3. Wear Resistance

The wear resistance was measured in accordance with the provisions of ASTM-D2228 using a Pico wear tester. The comparison was performed by using an index value. The higher the index value, the better the performance.

4. Wet Grip Performance

The wet grip performance was measured by using a portable wet grip skid tester from Stanely Co. of England. The test value was obtained by forming 1 mm thick water film over the testing surface prepared from dense grain size asphalt and by sliding the tester with rubber mounted on it on the surface. For comparison, the measured value and the index value are shown; the figure in parenthesis shows the index. The higher index value means better performance.

5. Rolling Resistance

Tires of 185/70 HR 14 were prepared using the tire composite listed in the respective tables for their tire treads and the performance was measured. In accordance with the Twinroll system in the measuring method described in Report of the U.S. Society of Engineering SAE No. 770875 the tire was mounted on a 5-J×14 rim and the rolling resistance was measured at 3.15 kg/cm$^2$ of air pressure and 336 kg load. A comparison is made by means of an index wherein the smaller index represents more preferable performance.

6. Cracking Property

This measurement was conducted by using a de mattia machine (bending tester) and by following the JIS. A comparison was made by using a cycle value (the number of cycles counted) until the formation of a crack.

7. Steering Stability

Using the same tires as those used in the foregoing rolling resistance test, a travelling test was conducted at 60 km/hr and 80 km/hr by mounting the tires on a vehicle and the feeling (feedback sensation) was measured and indicated by an index.

In the foregoing tests, the respective results of the tests for the wear resistance tests are indicated for comparison by means of an index by setting Sample No. 2 as a standard with an index of 100.

Figure 3:
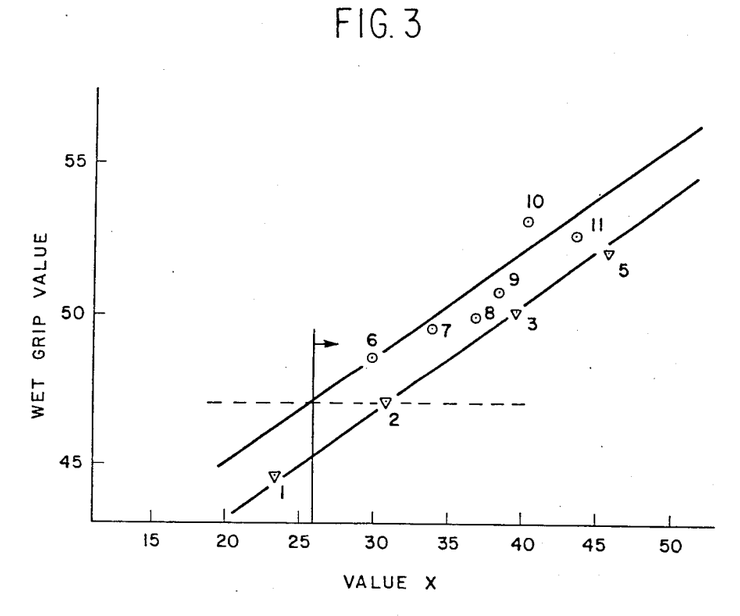
FIG. 3 is a graph showing the relationship between the value X and the wet grip value.

In the test results mentioned above, as to wet grip performance, as can be seen in FIG. 3, in order to obtain a performance better than that of Sample No. 2 with a standard composition, a wet grip value of above 47 must be achieved and the value of X plotted on the abscissa must be above 26. In the FIG. 3, the mark conventional polymers and the numbers indicate the number of the sample. The mark represents solution polymerization star shaped SBR and the numbers indicate the sample number.

Figure 4:
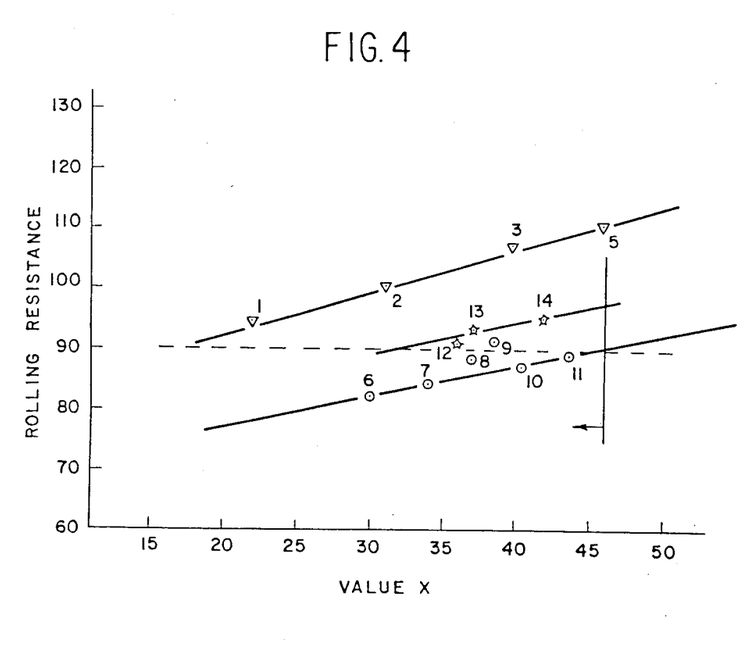
FIG. 4 is a graph showing the relationship between the value X and the rolling resistance index.

As for the rolling resistance in FIG. 4, Sample Nos. 6 through 11 are solution polymerization star shaped SBR while Sample Nos. 12 through 14 are solution polymerization chain formed SBR. Although they share the same value X the solution polymerization star shaped SBR is advantageous in low fuel cost performance.

In FIG. 4 if it is assumed that graded values lower by more than 10 percent than the standard values of Sample No. 2 are effective, the samples with the values below the standard line indicated by the dotted line for values lower by 10 percent are solution polymerization star shaped SBR and the values X of these samples are approximately below 45. However, in the FIG. 4, Sample No. 9 is not included within the foregoing standard line. It is assumed that this is a result of the vinyl content (%)/styrene content (%) which is shown in FIG. 2 wherein the styrene content is more then 20 percent.

In FIG. 4 the symbol emulsion polymerization SBR, symbol represents solution polymerization normal chain SBR and the symbol represents solution polymerization star shaped SBR.

Figure 5:
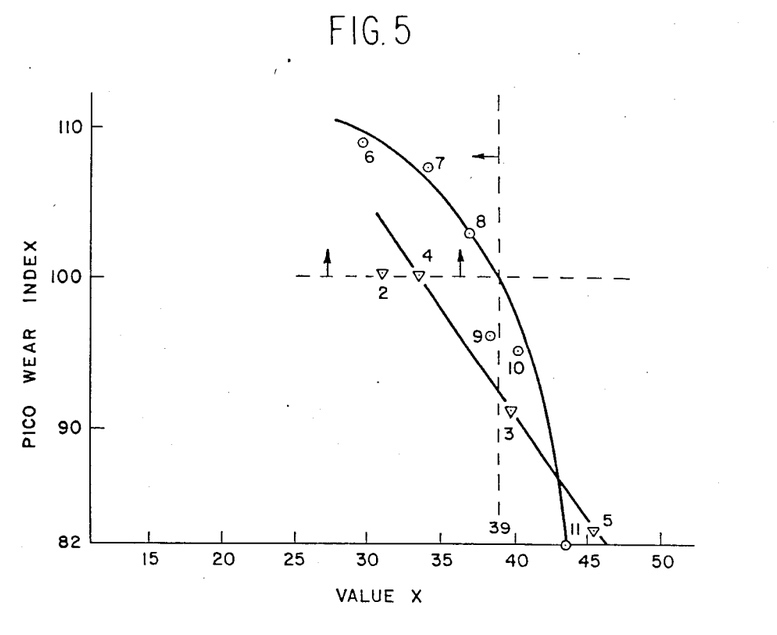
FIG. 5 is a graph showing the value X and the Pico wear index.

FIG. 5 shows the Pico wear index on the ordinate and the value X on the abscissa and plotted thereon are the values of the emulsion polymerization SBR Samples No. 2, 3, 4 and 5 which are indicated by a white triangle and the solution polymerization SBR Samples Nos. 6, 7, 8, 9 and 11 which are indicated by a white circle. The FIG. 5 indicates that the SBR's with a wear resistance higher than that of Sample No. 2 with the standard composition have a value X within the range below 39 and above 26.

The foregoing results suggest that for providing a satisfactory rolling resistance as well as wear resistance the value X must be in the range above 26 but below 39 and the styrene content must be below 20 percent. Also, because the increase in vinyl content (%) causes a significant decrease in the wear resistance, it is preferable to keep the vinyl content below 50 percent, as shown in the vinyl content/styrene content in the respective tables. Furthermore, when the styrene content becomes less than 10 percent, the tensile strength is reduced and therefore above 10 percent is preferable for the styrene content.

Figure 6:
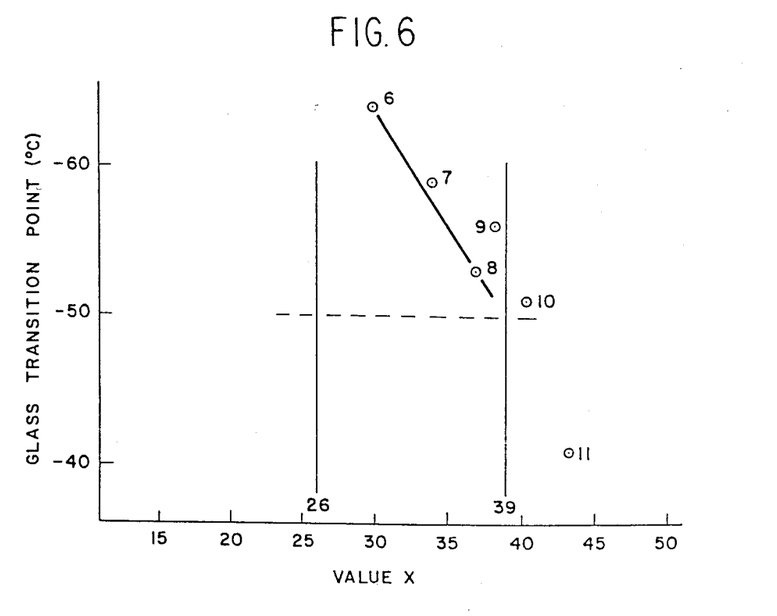
FIG. 6 is a graph showing the relationship between the value X and the glass transistion point.

FIG. 6 shows the relationship between the glass transition point and the value X, wherein the measured values of the solution polymerization star shaped SBR Samples Nos. 6 through 11 which are outstanding in their characteristic properties are plotted. As can be seen in the figure, those showing values falling within the range of 26 to 39 for the value X are the samples between Nos. 6 and 9.

As to the anti-crack property and the steering stability, all are in general superior to the conventional standard polymers. Also, as is shown in Table 4, those containing solution polymerization SBR more than 30 percent in content prove to be excellent in all physical properties.

As shown in Table 1, emulsion copolymer has a ratio of rolling resistance index to wet grip index lager than 0.82, which means a high fuel consumption. In respect to Sample No. 6, 7 and 8 and Table 2, the difference of Tg between measured and estimated is smaller than 10 which means better randomness, and they have preferable performances in wear resistance as well as a ratio of rolling resistance to wet grip. On the contrary, Sample No. 9 being of high styrene content, wear resistance and a ratio of rolling resistance to wet grip are inferior. Sample No. 10 has the difference of Tg between measured and estimated larger than 10, which means that styrene forms a block, and wear resistance is inferior. Sample No. 11 being of high vinyl content which is larger than 50, accordingly glass transition point (Tg) becomes high with a result of inferior wear resistance.

It should be apparent from the foregoing test results that composites containing more than 30 percent of solution polymerization styrene-butadiene copolymers whose X value fails within the range of 26 to 39 are great in rolling resistance as well as wet grip performance and also show well balanced excellent characteristics in the other properties as well. In particular, the star shaped polymer SBR formed by solution polymerization show the most preferable characteristics.

It should be apparent to those skilled in the art that the above described examples and embodiments of the present invention. Numerous and various other arrangements can be easily devised by those skilled in the art without departing from the spirit and the scope of the present invention.

I claim:

1. A tire tread composition for reducing energy consumption containing at least 30% star shaped random styrene-butadiene copoymer obtained by solution polymerization, and said star shaped random styrene-butadiene copolymer having a styrene content which is less than 20% and more than 10% and a vinyl content which is less than 50% and more than 40% and wherein the composition value X of said styrene-butadiene copolymers obtained by the following equation being in a range of 26 to 39:

$$X = \text{content of styrene (\%)} + \frac{\frac{100 - \text{styrene-content}}{100} \times \text{vinyl content (\%) in } BR}{2}$$

wherein BR is the butadiene component, and said copolymer having only one glass transition temperature below $-50°$ C. and being lower than estimated glass transition temperature following Gordon-Taylor equation by $5°$ to $10°$ C.

2. A composition for tires according to claim 1, wherein loss modulus of cured composition is lower than $1 \times 10^{-7}$ dyn/cm$^2$.

3. A composition for tires according to claim 1, wherein a ratio of rolling resistance to wet grip is smaller than 0.82.

* * * * *

UNITED STATES PATENT AND TRADEMARK OFFICE
CERTIFICATE OF CORRECTION

PATENT NO. : 4,785,058
DATED : November 15, 1988
INVENTOR(S) : Tatsuo Sakashita, et al It is certified that error appears in the above-identified patent and that said Letters Patent is hereby corrected as shown below: On the title page At [75] Inventors, change "Takyya Okazaki" to --Takuya Okazaki--.

Signed and Sealed this

Ninth Day of May, 1989

Attest:

DONALD J. QUIGG

Attesting Officer

Commissioner of Patents and Trademarks